E. A. JACOBSON.
TURBINE WATER WHEEL.
APPLICATION FILED APR. 8, 1919.
1,345,493.
Patented July 6, 1920.
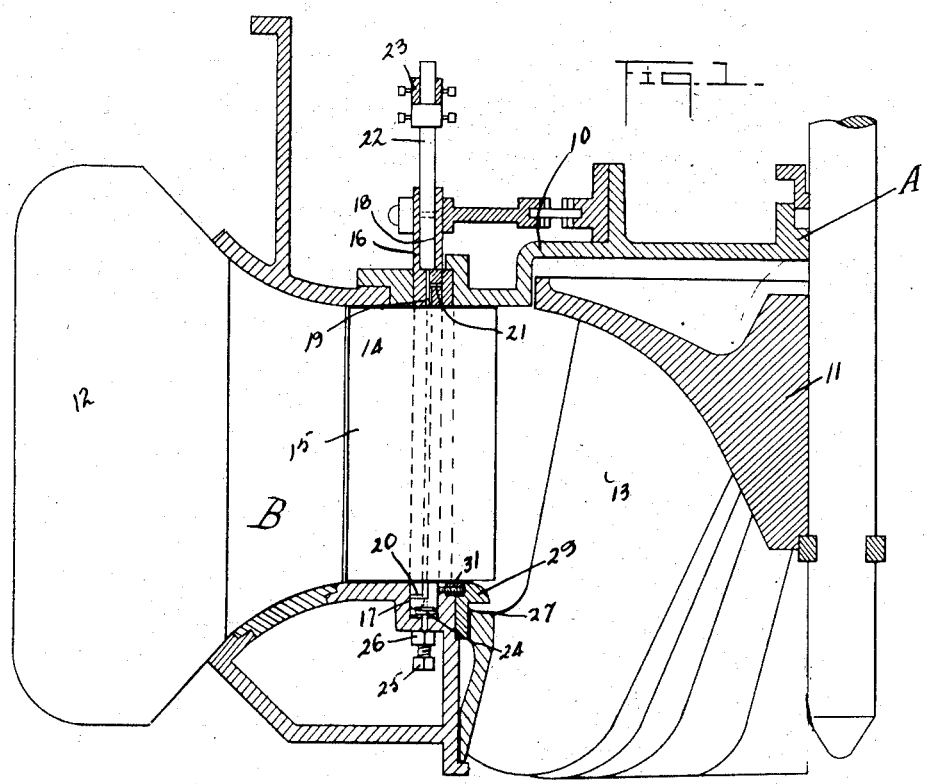
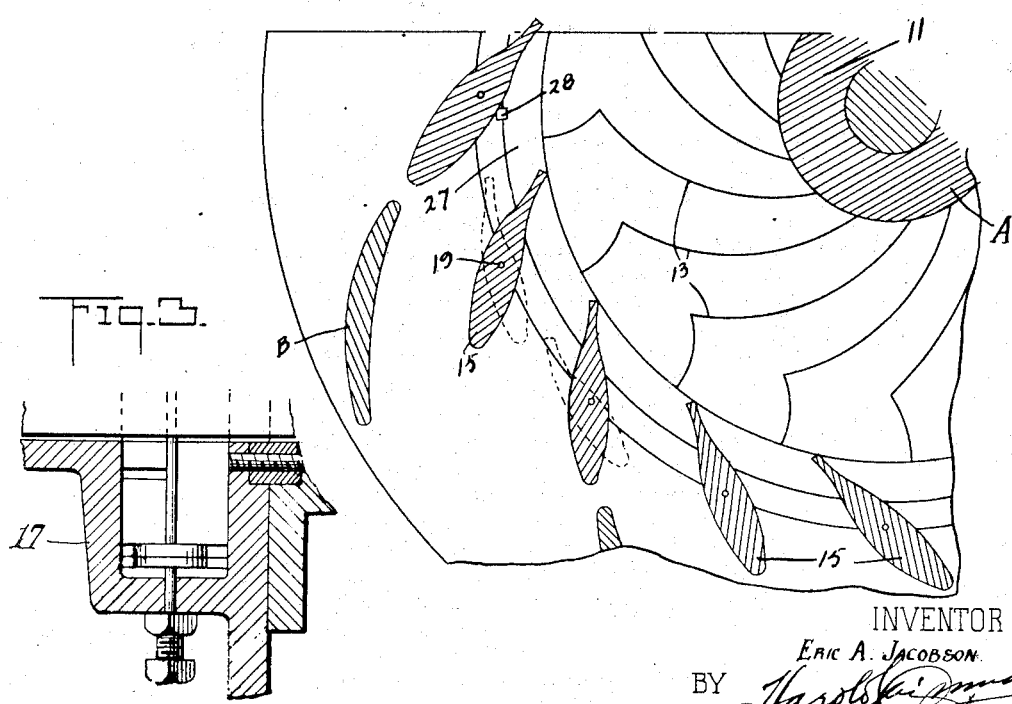
INVENTOR
Eric A. Jacobson.
BY *Harold ...*
ATTORNEY

UNITED STATES PATENT OFFICE.

ERIC ANTON JACOBSON, OF LINDSAY, ONTARIO, CANADA.

TURBINE WATER-WHEEL.

1,345,493.  Specification of Letters Patent.  Patented July 6, 1920.

Application filed April 8, 1919. Serial No. 288,536.

*To all whom it may concern:*

Be it known that I, ERIC A. JACOBSON, a citizen of the Dominion of Canada, residing at Lindsay, in the county of Victoria and Province of Ontario, Canada, have invented certain new and useful Improvements in Turbine Water-Wheels, of which the following is a specification.

This invention relates to improvements in turbine water wheels, the main object of which is to provide an arrangement of parts whereby the runner can be easily removed from the outer incasement which forms the passageway through which the water passes before striking the runner.

A further object of this invention is to provide a removable non-rotatable ring between the passageway and the runner so as to facilitate the guiding of the water to the lower part of the runner and by so doing increase the efficiency of the turbine.

A further object is to provide a turbine water wheel having an automatic lubricating means for the guide vanes which can be adjusted to accommodate various weights of lubricants.

A further object is to provide a turbine water wheel whereby the guide vanes are suitably mounted at their lower ends in anti-friction thrust blocks thereby providing a means whereby the guide vanes can be turned in an easier manner, to the desired angle for deflecting the water against the runner.

With these and other objects in view, which will be made clear as the specification develops, the invention consists of the improved construction and arrangement of parts particularly described and illustrated and set forth in the appended claims.

In the drawings:—

Figure 1 is a fragmentary sectional elevation of a water turbine embodying my invention, and Fig. 2 is a sectional plan view of the same.

Fig. 3 is an enlarged section through the step bearing.

Like numerals refer to like parts in the drawings.

In the construction of turbine water wheels at the present time there seems to be considerable unnecessary work required in the dismantling of the various subsidiary parts before it is possible to remove the runner should the latter require repairs.

In this invention I provide a turbine water wheel which can be easily dismantled so as to remove the runner.

Referring to the drawings, A represents a water turbine comprising a casing 10 in which a rotatably mounted runner 11 is positioned. 12 is an annular water chamber, serving as a spiral or volute intake, which water chamber is for carrying the inflowing water from the intake pipe to the runner through a suitable passageway 14. B is the usual stationary speed ring.

It is thought unnecessary to further describe these parts as they are well known in the art and do not form part of the present invention except in so far as my improvements are combined therewith. The desired flow of the water through the passageway 14 is so directed by guide vanes 15 which are adjustably positioned at the desired angle relatively to the runner vanes 13, so that the flow of water will be directed against the said vanes to obtain the highest efficiency from the turbine.

As stated before, former constructions of turbines have been found to have undesirable features in what is commonly known as the guide rings. Some turbines are made with the guide ring formed as a part of the lower portion of the passageway 14. This construction is undesirable as it requires the dismantling of the passageway and various other parts before the runner can be lifted in an upwardly direction owing to the guide ring obstructing such upward lift.

In my invention I provide a removable non-rotatable ring 27. 31 is a block of any desirable nature which is suitably positioned to prevent upward movement of the ring 27. This block is held in place by retaining set screw, as seen in Fig. 1. This block prevents any rotary motion to the guide ring 27. This guide ring 27 might be formed angular as shown in Fig. 1 or it might be a flat ring. I preferably show a ring having its inwardly extending flange rounded in the inner edge 29 so as to give the desired direction of the water flow to the lower portion of the vanes 13.

In dismantling, the casing 10 is removed, the gates stepped in the socket are removed, the guide vanes 15 turned in alinement with each other as indicated by dotted lines in Fig. 2, and the crane is then attached to the central shaft and the runner is lifted upwardly, carrying with it the guide ring 29.

When it is desirous of removing the runner 11 it will be necessary to remove the bolts that secure the casing 10 and the block 31 and its retaining set screw so as to allow upward movement of the ring 27. When these are removed the casing 10 may be lifted upwardly. The guide vanes 15 are then closed. The ring 27 may then be lifted up which will leave the runner 11 free to be removed without the dismantling of the water chamber 12 or passageway 14.

The guide vanes 15 are suitably mounted by having their pivot ends journaled in step bearings 17 formed in the lower wall of the passageway 14. By this the guide vanes 15 are not bearing their full weight on their lower extremity against the under side of the passageway 14 as this would necessitate a very heavy turning load when it was desired to turn the guide vanes 15 so as to control the power or force of water-drive striking the vanes 13 of the runner.

To this end anti-friction thrust blocks 24 are provided between the lower pivot end and the bottoms of the step bearings 17. The thrust blocks are adjusted vertically by set screws 25 which are threaded through the step bearings and retained in adjusted position by the lock nuts 26.

The upper end of the vanes 15 are pivotally formed as at 16 having a suitable orifice 18 extending partially through the longitudinal axis thereof, said orifice connecting with a conduit 19 having branch conduits 20 and 21 which extend radially to the periphery of the spindle 16.

By having the orifice 18 it is not necessary to have grease cups or other extra and unnecessary devices for containing a supply of lubricant. The lubricant is put into the orifice 18 and a suitable plunger 22 is slidably mounted in the said orifice so as to press the lubricant out of the orifice into the conduits 19, 20 and 21 to the journals. The plunger 22 is weighted as at 23, which weights are removably secured to the plunger so that any desired weight may be used in controlling the flow of the lubricant as desired. It will thus be seen that it is unnecessary to have the operator of the turbine water wheel tighten down any grease cups or such like in the lubricating of the guide vanes.

A great increase in efficiency is caused by the guide ring being rounded off at the top so as to cause the flow of water to strike the full length of the vane. In some turbines this guide ring is formed as a part of the base and extends inwardly over the lower end of the guide vane, thus diminishing the surface on which the water strikes.

It will be understood that while I have illustrated one form of my invention, changes may be made in the parts within the scope of the claims and without departing from the spirit of my invention.

What I claim as new, is,—

1. In a turbine water wheel comprising a casing, a water chamber, a passageway having adjustably positioned guide vanes therein, a runner suitably positioned within said passageway, said runner and said passageway being so constructed that said runner may be removed after removing the top wall without dismantling said passageway, and a removable non-rotatable guide ring between said passageway and said runner.

2. In a turbine water wheel comprising a runner suitably positioned, a water chamber, a passageway from said chamber to said runner, a removable guide ring between said passageway and said runner and fixed relatively to said passageway against rotary motion, and said runner and passageway being formed without obstruction for the removal of said runner.

3. In a turbine comprising a casing, water chamber and runner, the combination of guide vanes, journaled spindles supporting the vanes provided with central orifices terminating in conduits having branches communicating with the journals, and means whereby the lubricant is forced through the conduits to the journals, said means consisting of a plunger with removable weights suitably positioned in said hollow spindles.

4. In a turbine comprising a casing, water chamber and runner, the combination of guide vanes, journaled hollow spindles carrying the guide vanes, and means whereby lubricant is forced through the spindles to the journals, said means consisting of a plunger with removable weights suitably positioned in said spindles.

5. In a turbine water-wheel, a runner mounted inside a water chamber, said water chamber having a passageway to said runner, and a removably-mounted non-rotatable guide ring between said runner and passageway and having an inwardly-extending flange rounded at the inner edge, the casing, gates, runner, and guide ring being constructed and arranged to permit simultaneous removal of the runner and guide ring.

In testimony whereof I affix my signature in the presence of two witnesses.

ERIC ANTON JACOBSON.

Witnesses:
 A. H. ROBERTSON,
 WALDON LAW.